(12) United States Patent  (10) Patent No.: US 7,810,112 B2
Smith                     (45) Date of Patent:    *Oct. 5, 2010

(54) SECURE TIME ELEMENT

(75) Inventor: Perry Smith, Maale Adumim (IL)

(73) Assignee: NDS Limited, Middlesex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/426,990

(22) Filed: Apr. 21, 2009

(65) Prior Publication Data

US 2009/0204987 A1     Aug. 13, 2009

Related U.S. Application Data

(63) Continuation of application No. 10/505,825, filed as application No. PCT/IL03/00315 on Apr. 15, 2003, now Pat. No. 7,540,008.

(51) Int. Cl.
*H04N 7/16*     (2006.01)
*G11C 7/00*     (2006.01)

(52) U.S. Cl. .......................... 725/25; 365/194

(58) Field of Classification Search .......... 725/25, 725/112; 365/194
See application file for complete search history.

(56) References Cited

U.S. PATENT DOCUMENTS

| 4,882,473 | A |   | 11/1989 | Bergeron et al. |
| 4,908,502 | A |   | 3/1990  | Jackson |
| 4,933,898 | A |   | 6/1990  | Gilberg et al. |
| 5,060,261 | A |   | 10/1991 | Avenier et al. |
| 5,416,423 | A |   | 5/1995  | De Borde |
| 5,550,919 | A |   | 8/1996  | Kowalski |
| 5,592,212 | A |   | 1/1997  | Handelman |
| 5,594,227 | A |   | 1/1997  | Deo |
| 5,644,638 | A |   | 7/1997  | Thiriet |
| 5,789,733 | A |   | 8/1998  | Jachimowicz et al. |
| 5,816,917 | A |   | 10/1998 | Kelmer et al. |
| 5,830,068 | A |   | 11/1998 | Brenner et al. |
| 5,851,149 | A |   | 12/1998 | Xidos et al. |
| 5,852,290 | A | * | 12/1998 | Chaney ...................... 235/492 |
| 5,871,398 | A |   | 2/1999  | Schneier et al. |
| 5,880,523 | A | * | 3/1999  | Candelore ................... 257/679 |
| 5,988,510 | A |   | 11/1999 | Tuttle et al. |
| 6,004,211 | A |   | 12/1999 | Brenner et al. |
| 6,068,192 | A |   | 5/2000  | McCabe et al. |

(Continued)

FOREIGN PATENT DOCUMENTS

FR     2644584     9/1990

(Continued)

OTHER PUBLICATIONS

English translation of WO00/33456, dated Jun. 8, 2000.

(Continued)

*Primary Examiner*—Brian T Pendleton
*Assistant Examiner*—Jean D Saint Cyr
(74) *Attorney, Agent, or Firm*—Ladas & Parry LLP

(57) ABSTRACT

Apparatus comprising a secure time element comprising a timing device that outputs to a plurality of delay devices, wherein the delay devices have characteristic delay times which are alterable as a result of a tampering attempt to tamper therewith, and wherein a characteristic delay time of one of the delay devices changes differently from another one of the delay devices as a result of the tampering attempt.

16 Claims, 4 Drawing Sheets

U.S. PATENT DOCUMENTS

| | | | |
|---|---|---|---|
| 6,089,981 | A | 7/2000 | Brenner et al. |
| 6,099,409 | A | 8/2000 | Brenner et al. |
| 6,152,367 | A | 11/2000 | Kowalski |
| 6,193,163 | B1 | 2/2001 | Fehrman et al. |
| 6,234,898 | B1 | 5/2001 | Belamant et al. |
| 6,273,339 | B1 | 8/2001 | Tuttle et al. |
| 6,276,604 | B1 | 8/2001 | Proidl |
| 6,289,455 | B1 | 9/2001 | Kocher et al. |
| 6,408,388 | B1 | 6/2002 | Fischer |
| 6,481,623 | B1 | 11/2002 | Grant et al. |
| 6,508,709 | B1 | 1/2003 | Karmarkar |
| 2001/0015382 | A1 | 8/2001 | Tiffany, III |
| 2002/0036879 | A1 | 3/2002 | Vacherand et al. |
| 2002/0147047 | A1 | 10/2002 | Letovsky et al. |
| 2003/0026589 | A1 | 2/2003 | Barton et al. |
| 2004/0166942 | A1 | 8/2004 | Muir |
| 2005/0025312 | A1* | 2/2005 | Rijkaert et al. ............ 380/37 |
| 2005/0084106 | A1 | 4/2005 | Venema et al. |

FOREIGN PATENT DOCUMENTS

| | | |
|---|---|---|
| WO | 99/39312 | 8/1999 |
| WO | 00/33456 | 6/2000 |

OTHER PUBLICATIONS

English translation of FR 2644584, dated Sep. 21, 1990.

Rousseau, L. "Secure Time in a Portable Device." *Proc. Of Gemplus Developer Conference* (2001) pp. 1-8.

* cited by examiner

SECURE TIME ELEMENT

RELATED APPLICATION INFORMATION

The present application is a Continuation of U.S. patent application Ser. No. 10/505,825 filed Feb. 11, 2005, now U.S. Pat. No. 7,540,008 which is a 35 USC §371 application of PCT/IL2003/000315, which was filed on 15 Apr. 2003 and titled "Secure Time Element", and which was published in the English language on 28 Oct. 2004 with publication number WO 2004/092932.

FIELD OF THE INVENTION

The present invention relates generally to a method and apparatus for enhancing time security, particularly but not exclusively time security of a smart card, particularly but not exclusively for use with gambling systems.

BACKGROUND OF THE INVENTION

Gambling or gaming systems (the terms being used interchangeably throughout the specification and claims herein) that are operated via telecommunications are well known. For example, U.S. Pat. No. 5,592,212 to Handelman describes a pay television gaming system including a pay television network having a multiplicity of subscriber units each including a television, receiving apparatus for receiving gaming inputs from the multiplicity of subscriber units, transmitting apparatus for transmitting to the multiplicity of subscriber units information relating to gaming results and accounting apparatus for settling gaming debts and winnings via the pay television network. Users may use a smart card to gain access to the gaming system. The disclosures of U.S. Pat. No. 5,592,212 and all other references mentioned hereinbelow are hereby incorporated herein by reference.

It is noted that throughout the specification and claims the term "smart card" refers to any appropriate security device for secure transfer of data between users, wherein "users" encompasses, without limitation, persons, computers, data centers, data storage devices, memories and the like.

Another example is U.S. Pat. No. 5,816,917 to Kelmer et al., which describes a floppy-disk entertainment and gambling system for personal computers, utilizing one or more floppy disks or smart cards purchased from a licensed vendor or provider. When the disk or smart card is purchased, a predetermined, gambling credit-balance is credited to the "credit balance" field of the "wage-related control information" section of the disk or card. From that credit-balance, the purchaser may bet any desired amount, up to the maximum credited, during the playing of the gambling game. Before the start of play of the game, the player is asked the amount of his wager, whereupon, that amount is deducted from the "credit-balance" field and debited to the "debit-field". After having played the gambling game, the winnings, if any, are then credited to the "credit-field", or the losses, if any, are debit to the "debit-field" of the disk or card. After the player has used up all of the credit-balance, or if the credit-balance has reached a predetermined maximum, by means of one or more winnings, then the disk or card having the "wage-related control information" section is returned to the vendor or provider, for either the purchase of a new "credit-balance", or for the collection of the monies won.

Yet another example is U.S. Pat. No. 6,508,709 to Karmarkar, which describes virtual gaming at a remote location on-site or off-site of casino premises using live multimedia video or restricted pre-recorded video from autonomous randomly selected live casino games. The multimedia video source is at a casino and provides video signals depicting a number of various legally authorized live casino games. An accounting subsystem manages the compensation, credit accounts, and authentication for a remote player. A communication distribution hub connects the multimedia video source and the player accounting subsystem to a remote player station. The remote player station includes an appropriately secured display for displaying to a remote player the multimedia video signal depicting the legally authorized live casino game or a pre-recorded legally randomized casino game. The remote player station also provides appropriately secured gaming information which enables the legally authenticated (biometric or otherwise) remote player to place a bet. The remote player station also provides gaming information to enable the remote player to receive a payout. A remote player can concurrently play several dissimilar casino games. When selecting a game, the remote player can virtually roam around a casino and then participate in a plurality of selected games and purchase casino sponsored E-commerce services and products without leaving the remote game station.

The security of such gambling systems is of prime importance in order to prevent unscrupulous persons from cheating the system. For example, bets are placed at a certain time by means of the smart card. The gambling system relies on the smart card to determine the time of the bet. It is clear that bets may be permitted only before the start of a gambling event. However, it is conceivable that an unscrupulous person might attempt to place a bet on a gambling event (e.g., a horse race) after the event has already taken place and the results are known. Such a person might try to deceive the gambling system into thinking that the bet was placed before the start of the gambling event by tampering with the timing mechanism of the smart card.

SUMMARY OF THE INVENTION

The present invention seeks to provide improved methods and apparatus for enhancing time security, such as that of a smart card, for example, as is described in detail hereinbelow. The invention may have many applications, such as but not limited to, gaming or gambling systems, telecommunications systems, credit card systems, banking systems, securities and commodities trading systems, and the like.

There is thus provided in accordance with a preferred embodiment of the present invention apparatus including a secure time element including a timing device that outputs to a plurality of delay devices, wherein the delay devices have characteristic delay times which are alterable as a result of a tampering attempt to tamper therewith, and wherein a characteristic delay time of one of the delay devices changes differently from another one of the delay devices as a result of the tampering attempt. The secure time element is preferably associated with a smart card.

In accordance with a preferred embodiment of the present invention the smart card includes descrambling circuitry operative to enable descrambling of television signals.

Further in accordance with a preferred embodiment of the present invention the delay devices are coupled to a processor, the processor being pre-programmed with the characteristic delay times of the delay devices, and operative to process sensed delay times of the delay devices with a function to check for tampering of the delay devices.

Still further in accordance with a preferred embodiment of the present invention the timing device includes an oscillator.

Additionally in accordance with a preferred embodiment of the present invention the delay devices include at least one of a delay line, a logic buffer, a wire trace, a capacitor, a resistor, and an inductor.

In accordance with a preferred embodiment of the present invention the characteristic delay times of the delay devices vary as a function of factors including at least one of temperature, humidity, mechanical stress, and electromagnetic wave radiation.

Further in accordance with a preferred embodiment of the present invention a single output from the timing device is input into the delay devices.

There is also provided in accordance with a preferred embodiment of the present invention a system for communicating with a user system, the system including a smart card communicable with the user system, and a secure time element including a timing device that outputs to a plurality of delay devices, wherein the delay devices have characteristic delay times which are alterable as a result of a tampering attempt to tamper therewith, and wherein a characteristic delay time of one of the delay devices changes differently from another one of the delay devices as a result of the tampering attempt.

In accordance with a preferred embodiment of the present invention the secure time element is disposed in the smart card.

Further in accordance with a preferred embodiment of the present invention the user system establishes a starting time and an ending time of a user event associated with the user system.

Still further in accordance with a preferred embodiment of the present invention the user system establishes the starting time and ending time by means of time stamp messages sent to the smart card, wherein a first time stamp message is sent at a first time indicating permission to perform a user action and including time information indicating a starting time of the user event, and a second time stamp message is sent at a second time indicating prevention of performing a user action and including time information indicating a finishing time of the user event.

Additionally in accordance with a preferred embodiment of the present invention the user system includes a gambling system with which is associated a gambling event.

There is also provided in accordance with a preferred embodiment of the present invention a method including providing a smart card communicable with a user system, and providing a secure time element including a timing device that outputs to a plurality of delay devices, wherein the delay devices have characteristic delay times which are alterable as a result of a tampering attempt to tamper therewith, and wherein a characteristic delay time of one of the delay devices changes differently from another one of the delay devices as a result of the tampering attempt.

In accordance with a preferred embodiment of the present invention the method further includes processing sensed delay times of the delay devices with a function to check for tampering of the delay devices.

Further in accordance with a preferred embodiment of the present invention it is permissible to perform a user action if the delay devices have not been tampered with, whereas it is forbidden to perform the user action if the delay devices have been tampered with.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
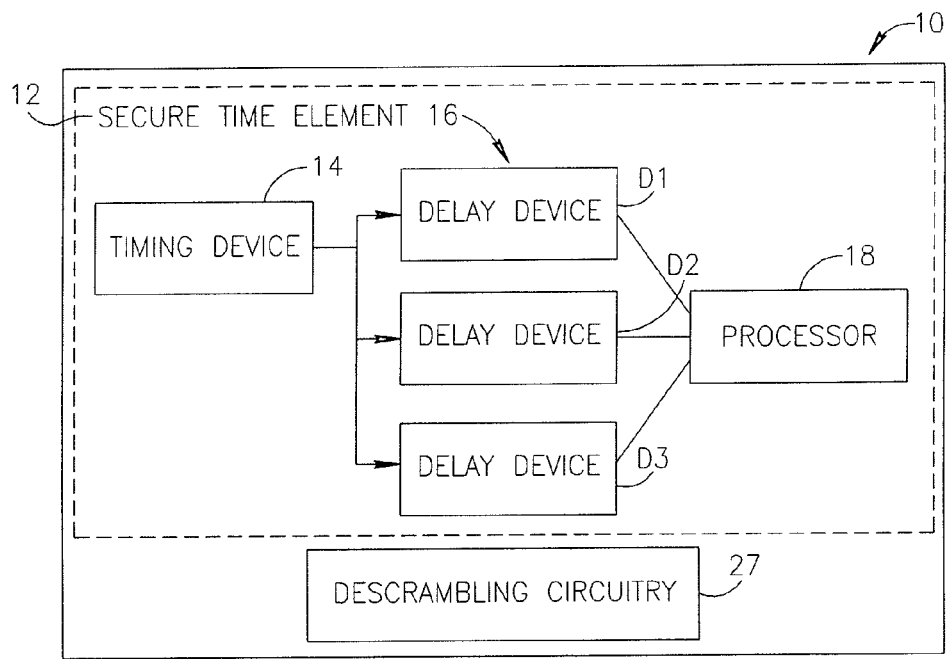
FIG. 1 is a simplified illustration of a secure time element for a smart card, constructed and operative in accordance with a preferred embodiment of the present invention.

Reference is now made to FIG. 1, which illustrates a secure time element 12 for a smart card 10, constructed and operative in accordance with a preferred embodiment of the present invention. Secure time element 12 may comprise circuitry contained in a single chip or multiple chips on smart card 10.

In accordance with a preferred embodiment of the present invention, secure time element 12 comprises a timing device 14 that outputs to a plurality of delay devices 16. Timing device 14 may comprise, without limitation, an oscillator, e.g., a square wave oscillator. The delay devices 16 may comprise, without limitation, delay lines, logic buffers, wire traces of any appropriate size and shape, capacitors in series with resistors, inductors, and other circuitry that provides time delays. In the illustrated embodiment, three delay lines D1, D2 and D3 are employed, but it is appreciated that the invention is not limited to this type or number of delay devices.

A single output from timing device 14 is preferably input into the delay devices 16 (in the illustrated embodiment, delay lines D1, D2 and D3). The delay devices 16 are preferably coupled to a processor 18. Processor 18 is preferably pre-programmed (e.g., stored in memory) with characteristic delay times of delay devices 16, and is capable of processing sensed delay times of the delay devices 16.

The characteristic delay times of one or more of the plurality of delay devices 16 are preferably altered as a result of an attempt to tamper with secure time element 12. The delay times may vary as a function of various factors or may react differently to stimuli, such as but not limited to, temperature, humidity, mechanical stress, electromagnetic wave radiation (e.g., microwaves, X-rays, etc.). Delay devices 16 are preferably chosen such that the changes in their characteristic delay times are not equal in response to these stimuli. For example, the temperature sensitivity of delay line D1 may be the same or approximately the same as that of delay line D3, whereas the sensitivity of delay line D2 to temperature may be much less. This may be accomplished by fabricating delay lines D1 and D3 in generally the same manner (e.g., both being the same type of logic buffer), and fabricating delay line D2 in another manner (e.g., using a wire trace longer in length than that of delay lines D1 and D3). In this way, the characteristic delay times of delay devices 16 are preferably unequally altered upon an unauthorized attempt to tamper with smart card 10.

Processor 18 preferably processes sensed delay times of the delay devices 16 and compares the sampled delay times with the stored values. Processor 18 may use any suitable logic function to check for tampering. For example, the delay times may be such that nominally the delay time of D1 is greater than that of D2, which in turn is greater than that of D3 (D1>D2>D3). The logic function may check if the condition D1>D2>D3 is met. If it is met, smart card 10 is deemed authentic; if not, smart card 10 is declared tampered and is preferably disqualified from use. It is appreciated that this is just one example of a condition for the logic function and many other possibilities may be used within the scope of the invention.

Figure 2:
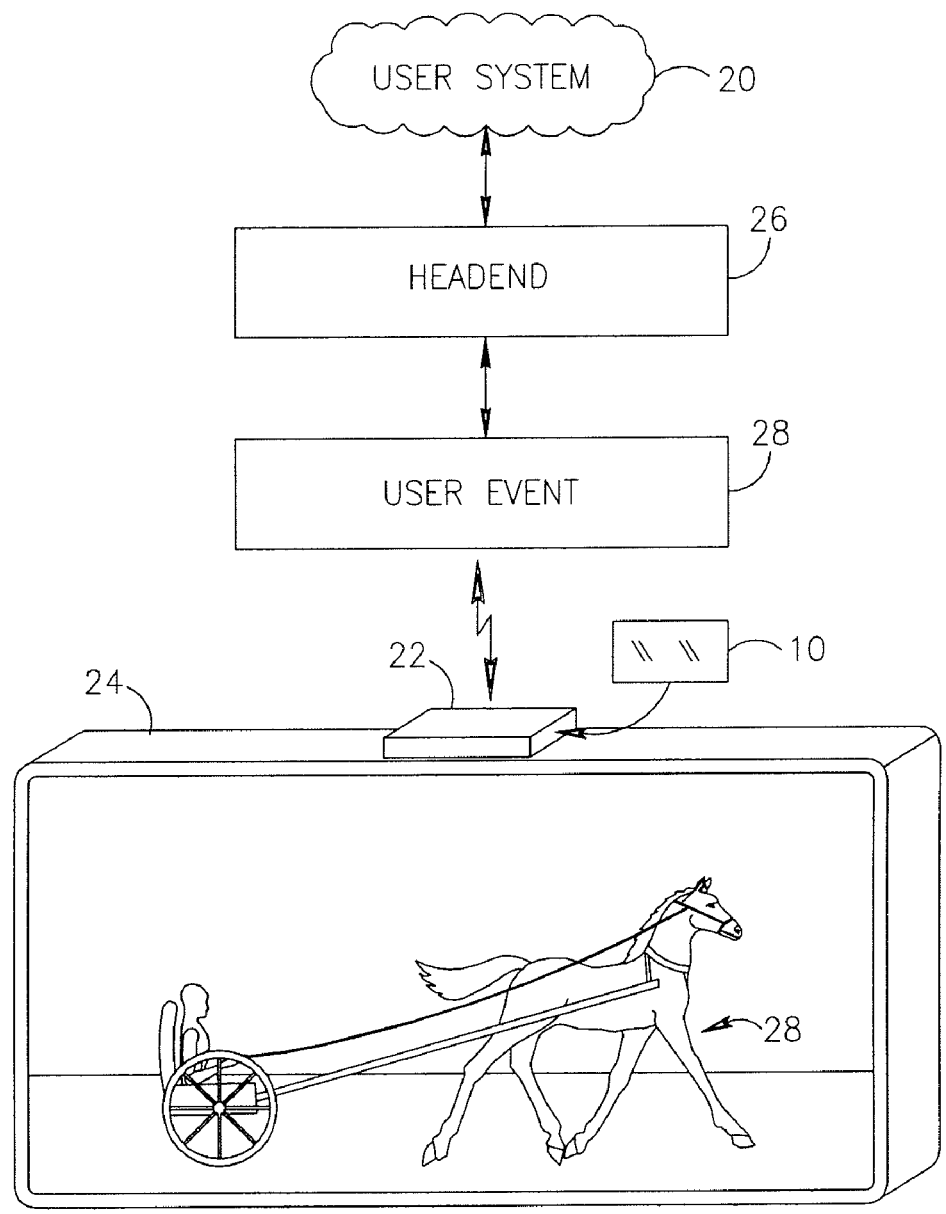
FIG. 2 is a simplified illustration of the smart card of FIG. 1 employed in a gambling system, in accordance with a preferred embodiment of the present invention.

Reference is now made to FIG. 2, which illustrates smart card 10 employed in a user system 20, in accordance with a preferred embodiment of the present invention. An example of user system 20 is described hereinbelow as a gambling system, but it should be emphasized that the invention is not limited to this example, and may be applied to other systems as well, such as but not limited to, telecommunications systems, credit card systems, banking systems, securities and commodities trading systems, and the like. Smart card 10 is preferably used with an integrated receiver device/decoder (IRD) 22, also referred to as a set-top box (STB), of a television set 24, which IRD 22 preferably communicates with user system 20 via a headend 26. In addition to the secure time element 12, smart card 10 preferably includes descrambling circuitry 27 that enables descrambling of the television signals for viewing a user event 28 (e.g., a gambling event) broadcast via headend 26. An example of using smart card 10 in the user system 20 is described with reference to FIG. 3.

User system 20 preferably establishes the starting time and ending time of user event 28. This may be accomplished by means of time stamp messages, as is described more in detail hereinbelow.

Figure 3A:
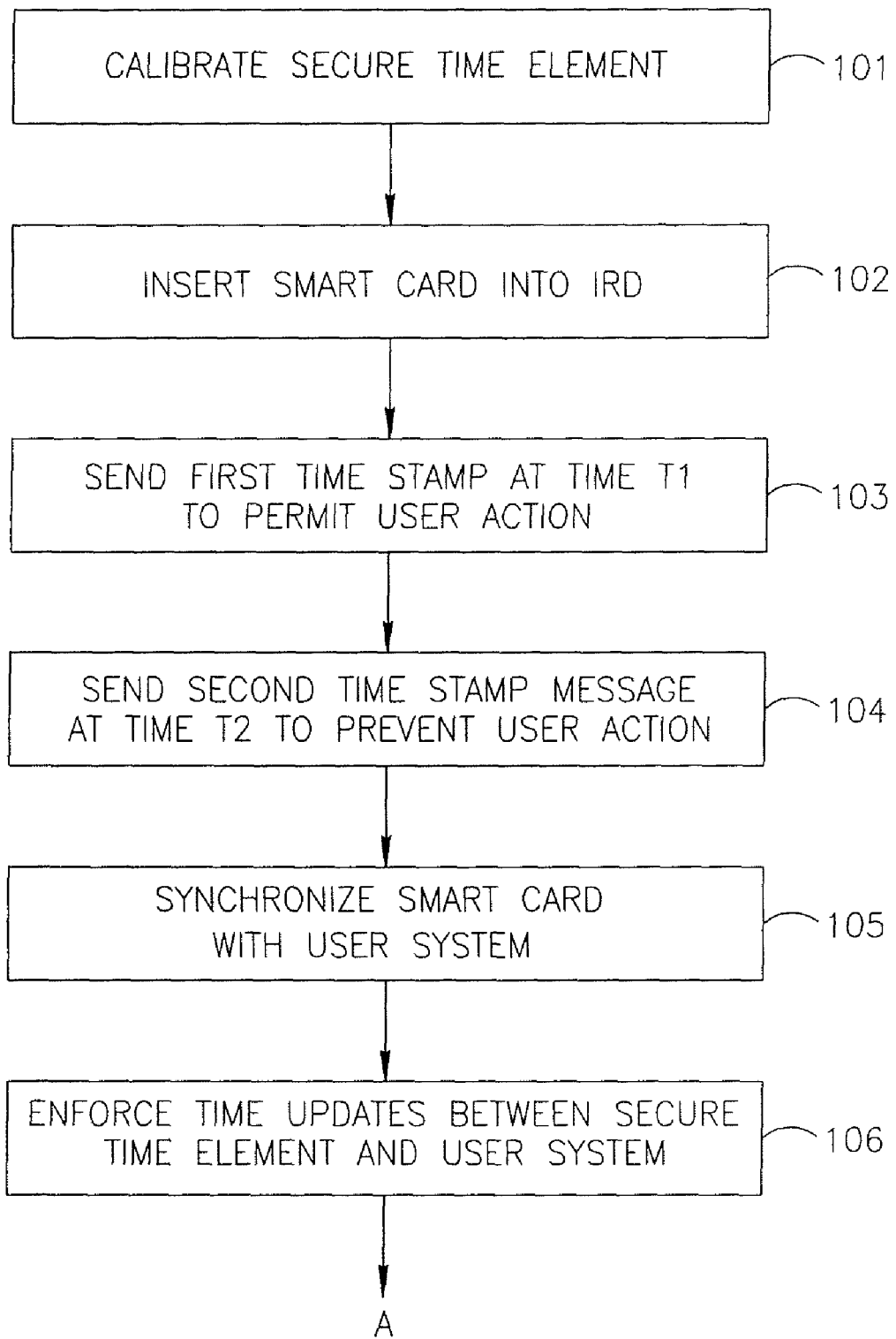
FIGS. 3A and 3B together form a simplified flow chart of a method for enhancing time security of a smart card, in accordance with a preferred embodiment of the present invention.
Figure 3B:
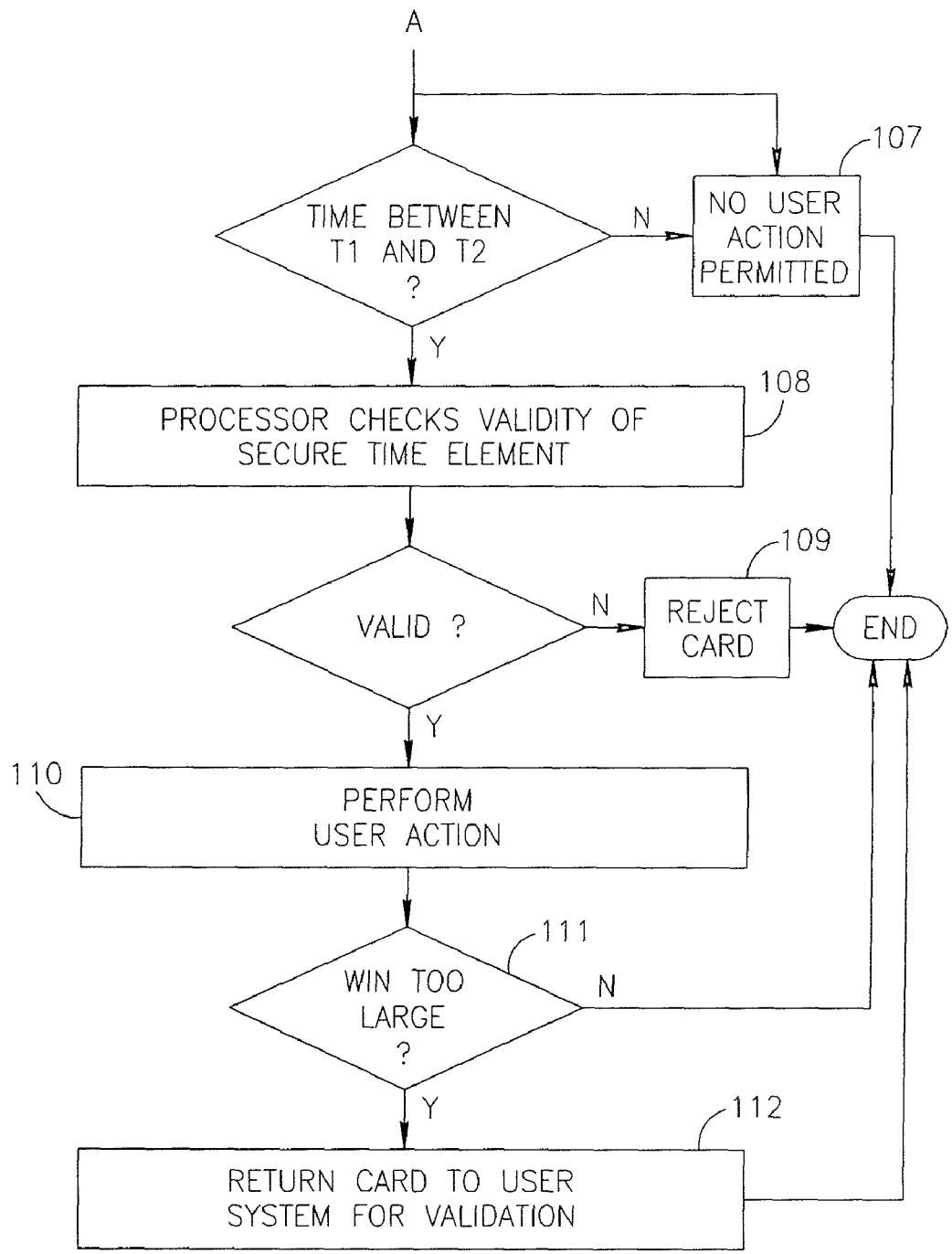

Reference is now made to FIGS. 3A and 3B, which illustrate a method for enhancing time security of smart card 10, in accordance with a preferred embodiment of the present invention.

The secure time element 12 of smart card 10 is preferably calibrated with respect to a time reference (step 101). Initially, the secure time element 12 may be calibrated by the manufacturer, and it may be further calibrated periodically during the course of its use via a telecommunication link to user system 20.

A user may insert smart card 10 into IRD 22 to perform an action (e.g., to place a bet) in the user system 20 (step 102); step 102 is optional, in that the smart card 10 may be present in IRD 22 before the method of FIGS. 3A and 3B is carried out. User system 20 preferably establishes the starting time and ending time of user event 28. One way of accomplishing this may be through the use of time stamp messages, as described in PCT published patent application WO 99/39312 entitled Game System, assigned to the current assignee of the present invention, the disclosure of which is hereby incorporated herein by reference. For example, a first time stamp message may be sent, typically from headend 26 (FIG. 2), at a first time T1 indicating that a bet may now be placed (step 103). Typically, the first time stamp message may include an instruction to smart card 10, typically an encoded instruction, instructing smart card 10 to permit placement of a bet. The first time stamp message preferably comprises time information indicating the starting time of user event 28.

A second time stamp message is typically sent from headend 26 at a second time T2, indicating that the time for betting on user event 28 is over (step 104). Typically, the second time stamp message may include an instruction to smart card 10, typically an encoded instruction, instructing smart card 10 to prevent placement of bets. The second time stamp message preferably comprises time information indicating the finishing time of user event 28.

Smart card 10 may communicate with user system 20 so as to synchronize with user system 20 (step 105). For example, smart card 10 may synchronize with user system 20 at a predefined time (e.g., 0.5-24 hours) before betting. The predefined time is preferably a function of different criteria, such as but not limited to, the stability of the circuitry of secure time element 12 (e.g., the stability of timing device 14 or the type of timing device 14 that is employed in smart card 10). Alternatively or additionally, the communication between smart card 10 and user system 20 may be triggered by the user tuning the IRD 22 to display a channel on TV set 24. Preferably smart card 10 periodically enforces time updates at any appropriate desired frequency between the secure time element 12 of smart card 10 and user system 20 (step 106). The time updates preferably verify if the accuracy of secure time element 12 is within predefined tolerances (e.g., the accuracy of timing device 14). Step 106 preferably includes verifying that time delays (if any) in the communication link between IRD 22 and user system 20 do not vary beyond a predefined limit. For example, the invention not being limited to this example, there may be different levels of routines that are carried out in processing communication between IRD 22 and user system 20, such as in a telephone line therebetween. The high level routines may proceed after receiving an errorless message in the low level routines. If there are bit errors in the communication, the low level routines may ask for retransmission until an errorless message is generated. Thus, as the bit errors increase, the time it takes to generate an errorless message to the high level routines increases. Accordingly, step 106 may comprise verifying that there are only very few bit errors in the telephone line between IRD 22 and user system 20.

If the time is not between T1 and T2, then no user action may take place (step 107). If the time is between T1 and T2, then processor 18 preferably checks the validity of the delay devices 16 of secure time element 12 as described hereinabove (step 108). If smart card 10 is invalid, e.g., it has been tampered with, then card 10 is preferably rejected (step 109). The system may permit one or more attempts before finally rejecting smart card 10.

If smart card 10 is found to be valid (e.g., no tampering), then the user is permitted to perform a user action (e.g., place a bet) (step 110). If the user wins a large amount greater than a predefined amount (step 111), then smart card 10 is preferably physically returned to user system 20 in order to verify that there was no tampering to smart card 10 (step 112).

It is noted that secure time element 12 may be used to prevent unscrupulous persons from trying to "spoof" user system 20, as similarly described in WO 99/39312, such as by delaying the transmission of certain time stamp messages. By employing secure time element 12, such attempts are futile.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable subcombination.

It will be appreciated by person skilled in the art that the present invention is not limited by what has been particularly shown and described herein above. Rather the scope of the present invention is defined only by the claims that follow:

What is claimed is:

1. A method for detecting a tampering attempt comprising a stimulus applied by a tamperer, the method comprising:
   providing a secure time element comprising:
      a timing device that provides an output;
      a plurality of delay devices arranged in parallel, wherein:
         each of said delay devices receives the output;
         each of said delay devices has a characteristic delay time which changes in reaction to said stimulus; and
         said characteristic delay time of one of said delay devices changes differently from said characteristic delay time of another one of said delay devices in reaction to said stimulus;
   receiving a signal from each of said delay devices; and
   processing sensed delay times of said delay devices and producing a result indicative of whether a tampering attempt has occurred based, at least in part, on: said signal received from each of said delay devices; and said characteristic delay times of said delay devices.

2. Apparatus resistant to a tampering attempt comprising a stimulus applied by a tamperer, the apparatus comprising:
   a secure time element comprising:
      a timing device that provides an output;
      a plurality of delay devices arranged in parallel, wherein:
         each of said delay devices receives the output;
         each of said delay devices has a characteristic delay time which changes in reaction to said stimulus; and
         said characteristic delay time of one of said delay devices changes differently from said characteristic delay time of another one of said delay devices in reaction to said stimulus; and
      a processor in operative association with said plurality of delay devices and receiving a signal from each of said delay devices, said processor being operative to process sensed delay times of said delay devices and to produce a result indicative of whether a tampering attempt has occurred based, at least in part, on: said signal received from each of said delay devices; and said characteristic delay times of said delay devices.

3. Apparatus according to claim 2, wherein said secure time element is associated with a smart card.

4. Apparatus according to claim 3, wherein said smart card comprises descrambling circuitry operative to enable descrambling of television signals.

5. Apparatus according to claim 2, wherein said timing device comprises an oscillator.

6. Apparatus according to claim 2, wherein said delay devices comprise at least one of a delay line, a logic buffer, a wire trace, a capacitor, a resistor, and an inductor.

7. Apparatus according to claim 2, wherein the characteristic delay times of said delay devices vary as a function of said stimulus, and said stimulus comprises at least one of temperature change, humidity change, mechanical stress, and application of electromagnetic wave radiation.

8. Apparatus according to claim 2, wherein said processor is pre-programmed with said characteristic delay times of said delay devices.

9. A system for communicating with a user system, the system comprising:
   a smart card communicable with said user system; and
   a secure time element comprising:
      a timing device that provides an output;
      a plurality of delay devices arranged in parallel, wherein:
         each of said delay devices receives the output;
         each of said delay devices has a characteristic delay time which changes in reaction to said stimulus; and
         said characteristic delay time of one of said delay devices changes differently from said characteristic delay time of another one of said delay devices in reaction to said stimulus; and
      a processor in operative association with said plurality of delay devices and receiving a signal from each of said delay devices, said processor being operative to process sensed delay times of said delay devices and to produce a result indicative of whether a tampering attempt has occurred based, at least in part, on: said signal received from each of said delay devices; and said characteristic delay times of said delay devices,
   wherein the secure time element is operatively associated with the smart card.

10. The system according to claim 9, wherein said secure time element is disposed in said smart card.

11. The system according to claim 9, wherein said user system establishes a starting time and an ending time of a user event associated with said user system.

12. The system according to claim 11, wherein said user system establishes the starting time and ending time by means of time stamp messages sent to said smart card, wherein a first time stamp message is sent at a first time indicating permission to perform a user action and comprising time information indicating a starting time of the user event, and a second time stamp message is sent at a second time indicating prevention of performing a user action and comprising time information indicating a finishing time of the user event.

13. The system according to claim 9, wherein said user system comprises a gambling system with which is associated a gambling event.

14. The system according to claim 9, wherein said processor is pre-programmed with said characteristic delay times of said delay devices.

15. Apparatus comprising:
   smart card means for communicating with a user system; and
   means for secure timing comprising:
      a timing device that provides an output;
      a plurality of delay devices arranged in parallel, wherein:
         each of said delay devices receives the output;
         each of said delay devices has a characteristic delay time which changes in reaction to said stimulus; and
         said characteristic delay time of one of said delay devices changes differently from said characteristic delay time of another one of said delay devices in reaction to said stimulus; and
      a processor in operative association with said plurality of delay devices and receiving a signal from each of said delay devices, said processor being operative to process sensed delay times of said delay devices and to produce a result indicative of whether a tampering attempt has occurred based, at least in part, on: said signal received from each of said delay devices; and said characteristic delay times of said delay devices,
   wherein the means for secure timing is operatively associated with the smart card means.

16. Apparatus according to claim 15, wherein said processor is pre-programmed with said characteristic delay times of said delay devices.

* * * * *